Sept. 16, 1924.
G. AICHELE
1,508,908
TYPE BAR BALL BEARING
Filed Jan. 23, 1924
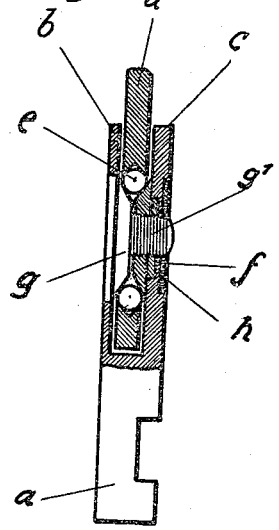
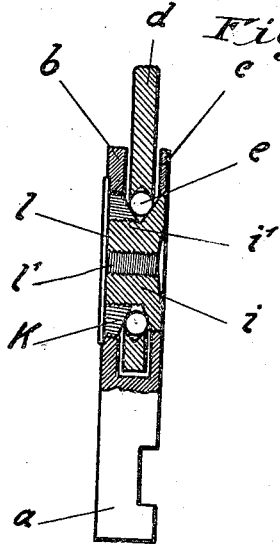
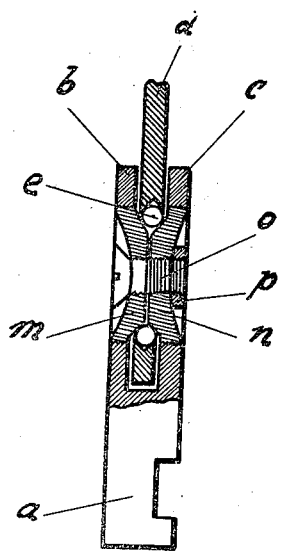

Patented Sept. 16, 1924.

1,508,908

UNITED STATES PATENT OFFICE.

GOTTLOB AICHELE, OF NELLINGEN, NEAR ESSLINGEN, GERMANY.

TYPE-BAR BALL BEARING.

Application filed January 23, 1924. Serial No. 687,902.

*To all whom it may concern:*

Be it known that I, GOTTLOB AICHELE, a citizen of the State of Wurttemberg, Germany, residing at Nellingen, near Esslingen, Wurttemberg, Germany, Kaiserstrasse 2, have invented certain new and useful Improvements in Type-Bar Ball Bearings, of which the following is a specification.

This invention relates to type-bars of the kind in which a ball-bearing supporting the bar is carried by the prongs of a member encompassing the supported end of the respective type-bar. My improvement in these type-bar supporting means consists in arranging the balls within the type-bar body, and the ball-supporting members in said prongs in such a manner that their outer faces project over the respective surfaces of the said prongs either not at all or only to a substantially inappreciable extent.

My invention is illustrated by way of example, in the accompanying drawing in which Figure 1 is a section of one of the improved arrangements and combination of parts, the lower part of the prong-forming member being shown in side-view. Figure 2 is a similar illustration showing a modification, and Figure 3 shows another modification.

The member $a$ is the supporting member for the ball-bearing, and terminates in two prongs $b$ and $c$, between which the type-bar $d$ is supported on the balls $e$; the latter are supported in their turn by two co-axial conical members, of which one is attached to one prong, and the other to the other prong. At its inner end the type-bar is formed with an annulus adapted to receive the balls $e$. In the example shown in Figure 1, the inner race consists of the conical members $g$ and $h$, of which $g$ is provided with a threaded pivot or central projection $g'$ onto which the member $h$ is screwed. The pivot $g'$ passes through a hole of the prong $c$ and exteriorly of the latter is provided with a nut-disk $h$, by which the conical members $g$ and $h$ forming the inner race are held in place. The outer race is formed by the appropriately shaped lower end of the type-bar $d$.

The modification illustrated in Figure 2 includes a male conical member $i$ and a female conical member $k$ which is threaded upon its outer periphery and is screwed into a suitably large and threaded aperture of the prong $b$; a threaded central projection $i'$ of the member $i$ is screwed into a correspondingly threaded central bore of the member $k$. In addition a threaded pin $l'$ secured to a thin disk $l$ is screwed into a threaded bore of the male race member $i$, $i'$. The diameter of the disk $l$ is a little larger than the diameter of the male member $k$ so that this latter is held securely in place in the prong $b$. In all other respects the arrangement is practically the same as in Figure 1.

In Figure 3 two concavo-convex inner race members $m$ and $n$ are screwed respectively into the prongs $b$, $c$; a screw $o$ extends through both inner race members for the accommodation of a nut $p$ to hold these parts together.

The supporting members $a$ with their prongs $b$ and $c$, and the bars $d$ with the balls $e$, for which they form the outer race are the same in all figures. A special advantage of the new arrangement and combination of parts consists therein that the ball-bearing, or its races respectively, is, or are, effectively protected against the admission of dust. A characteristic feature resides also in the fact that the outer faces of the conical members forming the inner race project over the outer or lateral faces of the prongs $b$ and $c$ either not at all or only to an inappreciable extent. For instance in Figure 1 only the free end of the pivot $g'$ projects very little beyond the outer face of the prong $c$, and in Figure 2 only the thin disk $l$ projects slightly over the face of the prong $b$; in Figure 3 no portion of the ball race members or their associated elements project beyond said prongs.

I claim:

A combined ball-bearing and type-bar for typewriting machines, comprising, in combination, a type-bar provided at its supporting end with an annulus constituting the outer race for the balls of the ball-bearings; a forked member, the prongs of which embrace said annulus and are each provided with an aperture, two conical members located in said aperture and forming at their adjacent sides the inner race, and a screw threaded projection comprising an integral part of one of said conical members and projecting axially into the other conical member for detachably securing said members together.

In testimony whereof I affix my signature in the presence of two witnesses.

GOTTLOB AICHELE.

Witnesses:
H. UEBELE,
A. LEMNITZER, Jr.